United States Patent
Gupta et al.

(10) Patent No.: US 12,047,373 B2
(45) Date of Patent: Jul. 23, 2024

(54) MONITORING RESOURCE UTILIZATION OF AN ONLINE SYSTEM BASED ON BROWSER ATTRIBUTES COLLECTED FOR A SESSION

(71) Applicant: salesforce.com, inc., San Francisco, CA (US)

(72) Inventors: Ankur Gupta, San Francisco, CA (US); Anuj Gargeya Malkapuram, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 142 days.

(21) Appl. No.: 16/675,094

(22) Filed: Nov. 5, 2019

(65) Prior Publication Data
US 2021/0136059 A1    May 6, 2021

(51) Int. Cl.
*H04L 9/40*    (2022.01)
(52) U.S. Cl.
CPC ...... *H04L 63/0853* (2013.01); *H04L 63/0876* (2013.01); *H04L 63/10* (2013.01); *H04L 63/1425* (2013.01)
(58) Field of Classification Search
None
See application file for complete search history.

(56) References Cited

U.S. PATENT DOCUMENTS

| | | | | |
|---|---|---|---|---|
| 5,991,809 A * | 11/1999 | Kriegsman | ......... | H04L 67/1008 709/229 |
| 7,770,174 B1 * | 8/2010 | Martin | ................. | H04L 63/101 713/168 |
| 8,286,220 B2 * | 10/2012 | Forristal | ............... | G06F 21/577 726/1 |
| 8,370,922 B1 * | 2/2013 | Doukhvalov | ........... | H04L 63/08 726/11 |
| 8,392,841 B1 | 3/2013 | Bowden et al. | | |
| 8,544,069 B1 * | 9/2013 | Subbiah | ................. | H04L 63/08 726/4 |
| 8,601,119 B1 | 12/2013 | Vassilakis | | |

(Continued)

OTHER PUBLICATIONS

Runiassy et al."Modeling Cloud-Computing Threats and Vulnerabilities," Thesis, Dec. 2016, pp. 1-1000 (Year: 2016).*

(Continued)

*Primary Examiner* — Luu T Pham
*Assistant Examiner* — James J Wilcox
(74) *Attorney, Agent, or Firm* — Sterne, Kessler, Goldstein & Fox P.L.L.C.

(57) ABSTRACT

An online system monitors resources utilization by users connecting with the online system and detects unauthorized resource utilization caused by sharing of sessions. The online system collects samples of browser attributes from browsers interacting with the online system. The online system determines a score indicating a difference between two samples of browser attributes taken at different times. The online system uses the score to determine whether the two samples of browser attributes in the same session were received from different browsers. If the online system detects unauthorized resource utilization if the two samples are determined to be from two different browsers. The online system takes mitigating actions, for example, by invalidating the session or requiring users to re-enter credentials.

18 Claims, 6 Drawing Sheets

(56) References Cited

U.S. PATENT DOCUMENTS

| | | | | |
|---|---|---|---|---|
| 8,694,374 B1* | 4/2014 | Diligenti | G06Q 30/02 | 705/14.47 |
| 8,751,466 B1* | 6/2014 | Tsay | G06F 16/951 | 707/700 |
| 8,832,275 B1* | 9/2014 | Hara | G06F 16/9574 | 709/226 |
| 8,850,050 B1* | 9/2014 | Qureshi | G06F 21/6218 | 709/227 |
| 8,955,076 B1* | 2/2015 | Faibish | H04L 63/0853 | 726/7 |
| 9,053,154 B1* | 6/2015 | Shah | G06F 16/24578 | |
| 9,065,827 B1* | 6/2015 | Taylor | H04L 67/535 | |
| 9,098,174 B1* | 8/2015 | Charytoniuk | G06F 16/95 | |
| 9,098,333 B1* | 8/2015 | Obrecht | G06F 9/50 | |
| 9,203,850 B1* | 12/2015 | Chen | H04L 41/0253 | |
| 9,223,557 B1* | 12/2015 | Gigliotti | G06F 21/12 | |
| 9,280,677 B1* | 3/2016 | Perry | H04L 67/10 | |
| 9,384,336 B1* | 7/2016 | Ashley | H04L 63/0263 | |
| 9,398,017 B1* | 7/2016 | Nizametdinov | H04L 41/0893 | |
| 9,600,651 B1 | 3/2017 | Ryan et al. | | |
| 9,635,041 B1* | 4/2017 | Warman | G06F 21/55 | |
| 9,665,650 B1* | 5/2017 | Hoelzle | G06F 16/245 | |
| 9,699,191 B1* | 7/2017 | Sokolov | H04L 63/102 | |
| 9,760,624 B1* | 9/2017 | Su | G06F 16/30 | |
| 9,769,167 B2* | 9/2017 | Mary | H04L 63/0876 | |
| 9,860,208 B1 | 1/2018 | Ettema et al. | | |
| 9,949,065 B1* | 4/2018 | Zarakas | G06Q 20/354 | |
| 9,965,133 B1* | 5/2018 | Lindsey | G06F 21/53 | |
| 9,979,747 B2* | 5/2018 | Bailey | H04L 43/16 | |
| 10,089,665 B2* | 10/2018 | Dickinson | G06Q 30/0609 | |
| 10,134,159 B1* | 11/2018 | Fermum | G06F 16/26 | |
| 10,142,362 B2* | 11/2018 | Weith | H04L 63/20 | |
| 10,171,495 B1* | 1/2019 | Bowen | H04L 63/1425 | |
| 10,212,170 B1 | 2/2019 | Canavor et al. | | |
| 10,237,298 B1* | 3/2019 | Nguyen | H04L 63/1408 | |
| 10,282,553 B1* | 5/2019 | Schroeder | G06F 21/6254 | |
| 10,311,386 B2* | 6/2019 | Gomez Uribe | G06Q 30/0201 | |
| 10,387,911 B1* | 8/2019 | Shaw | G06Q 30/0248 | |
| 10,430,441 B1* | 10/2019 | Canton | H04W 12/08 | |
| 10,452,736 B1* | 10/2019 | Nguyen | G06F 21/41 | |
| 10,511,590 B1* | 12/2019 | Bosch | H04L 63/20 | |
| 10,609,165 B1* | 3/2020 | Chauhan | H04L 67/535 | |
| 10,645,086 B1* | 5/2020 | Hadler | G06F 21/552 | |
| 10,657,242 B1* | 5/2020 | Xia | H04L 9/0825 | |
| 10,674,206 B1* | 6/2020 | Sabelli | H04N 21/44204 | |
| 10,771,458 B1* | 9/2020 | Xia | H04W 12/64 | |
| 10,830,863 B1* | 11/2020 | Shemesh | G01S 5/0278 | |
| 10,909,221 B1* | 2/2021 | Fregly | G06F 21/6218 | |
| 10,929,923 B1* | 2/2021 | Nguyen | G06Q 40/025 | |
| 10,943,063 B1* | 3/2021 | Mccown | G06F 21/31 | |
| 11,003,667 B1* | 5/2021 | Bakir | G06F 16/24575 | |
| 11,005,839 B1* | 5/2021 | Shahidzadeh | H04W 12/06 | |
| 11,050,740 B2* | 6/2021 | Craswell | H04L 63/0838 | |
| 11,140,157 B1* | 10/2021 | Xia | H04L 63/0853 | |
| 11,249,821 B1* | 2/2022 | Shah | G06F 9/5005 | |
| 11,258,827 B2* | 2/2022 | Biswas | H04L 63/20 | |
| 11,294,967 B2* | 4/2022 | Fox | G06F 16/958 | |
| 11,341,179 B1* | 5/2022 | Brandwine | G06F 16/532 | |
| 11,374,915 B1* | 6/2022 | Munsell | H04L 63/10 | |
| 11,425,134 B1* | 8/2022 | Patimer | H04L 67/562 | |
| 11,785,114 B1* | 10/2023 | Fregly | H04L 9/0894 | |
| 2002/0161903 A1* | 10/2002 | Besaw | G06F 21/6218 | 709/224 |
| 2003/0074580 A1* | 4/2003 | Knouse | H04L 63/0815 | 726/4 |
| 2004/0117489 A1* | 6/2004 | Harmon | H04L 63/102 | 709/229 |
| 2004/0199762 A1* | 10/2004 | Carlson | H04L 63/062 | 713/153 |
| 2005/0015621 A1* | 1/2005 | Ashley | H04L 63/0263 | 726/4 |
| 2006/0036951 A1* | 2/2006 | Marion | G06F 21/31 | 715/733 |
| 2006/0075122 A1* | 4/2006 | Lindskog | H04L 63/0823 | 709/228 |
| 2006/0136985 A1* | 6/2006 | Ashley | H04L 63/0407 | 726/1 |
| 2006/0140182 A1* | 6/2006 | Sullivan | H04L 67/306 | 370/395.3 |
| 2006/0190990 A1* | 8/2006 | Gruper | H04L 63/08 | 726/3 |
| 2006/0230058 A1 | 10/2006 | Morris | | |
| 2006/0235850 A1* | 10/2006 | Hazelwood | H04L 61/4523 | 707/999.009 |
| 2006/0253420 A1* | 11/2006 | Hinton | G06F 21/62 | |
| 2007/0094711 A1* | 4/2007 | Corley | G06F 21/554 | 726/3 |
| 2008/0082662 A1* | 4/2008 | Dandliker | H04L 63/10 | 709/225 |
| 2008/0162338 A1 | 7/2008 | Samuels et al. | | |
| 2008/0172366 A1* | 7/2008 | Hannel | H04L 63/20 | |
| 2008/0244744 A1 | 10/2008 | Thomas et al. | | |
| 2008/0249786 A1 | 10/2008 | Oldham et al. | | |
| 2009/0006577 A1 | 1/2009 | Estrada | | |
| 2009/0100517 A1* | 4/2009 | Kim | G06F 21/554 | 726/22 |
| 2009/0319785 A1* | 12/2009 | Wang | G06F 21/10 | 380/282 |
| 2010/0088698 A1* | 4/2010 | Krishnamurthy | H04L 63/10 | 718/1 |
| 2010/0115027 A1* | 5/2010 | Ryu | H04L 67/75 | 709/229 |
| 2010/0205057 A1* | 8/2010 | Hook | G06Q 30/0254 | 705/14.52 |
| 2011/0231443 A1* | 9/2011 | Hannel | H04L 63/0428 | 707/E17.014 |
| 2011/0287739 A1* | 11/2011 | Cajigas Bringas | H04L 63/0853 | 455/410 |
| 2011/0289575 A1* | 11/2011 | Shi | G06F 21/6218 | 726/8 |
| 2011/0320616 A1* | 12/2011 | Wray | H04L 63/102 | 709/228 |
| 2011/0320955 A1* | 12/2011 | O'Connor | H04L 63/104 | 726/4 |
| 2012/0215896 A1* | 8/2012 | Johannsen | H04L 67/02 | 709/223 |
| 2012/0317620 A1 | 12/2012 | Fefelov et al. | | |
| 2013/0036468 A1* | 2/2013 | Georgiev | G06F 21/51 | 726/23 |
| 2013/0047216 A1* | 2/2013 | Ajitomi | G06F 9/541 | 709/224 |
| 2013/0061285 A1 | 3/2013 | Donfried et al. | | |
| 2013/0132511 A1* | 5/2013 | Lee | H04W 4/60 | 709/217 |
| 2014/0129661 A1* | 5/2014 | Thyagaraja | H04L 51/224 | 709/207 |
| 2014/0157369 A1* | 6/2014 | Mischook | H04L 63/102 | 726/4 |
| 2014/0189799 A1* | 7/2014 | Lu | H04L 63/102 | 726/4 |
| 2014/0189819 A1* | 7/2014 | Grimaud | H04L 67/10 | 726/5 |
| 2014/0278746 A1* | 9/2014 | Kolowich | G06Q 30/0201 | 705/7.29 |
| 2014/0278942 A1 | 9/2014 | Buffamanti | | |
| 2014/0279546 A1* | 9/2014 | Poole | H04B 5/72 | 705/44 |
| 2014/0279736 A1* | 9/2014 | Glass | H04N 21/44213 | 706/12 |
| 2014/0280296 A1* | 9/2014 | Johnston | G06V 40/174 | 707/769 |
| 2014/0280482 A1* | 9/2014 | Crosley | G06F 16/958 | 709/203 |
| 2014/0280859 A1* | 9/2014 | Liu | H04L 63/10 | 709/223 |
| 2014/0282919 A1* | 9/2014 | Mason | H04L 67/02 | 726/4 |
| 2014/0283069 A1 | 9/2014 | Call et al. | | |

(56) References Cited

U.S. PATENT DOCUMENTS

| | | | |
|---|---|---|---|
| 2014/0337405 A1* | 11/2014 | Athas | H04L 67/567 709/203 |
| 2014/0359424 A1* | 12/2014 | Lin | G06F 16/955 715/234 |
| 2014/0379902 A1* | 12/2014 | Wan | H04L 63/1441 709/224 |
| 2015/0007330 A1* | 1/2015 | Gomez | G06F 21/577 726/25 |
| 2015/0025413 A1* | 1/2015 | Shennib | A61B 5/123 600/559 |
| 2015/0026037 A1* | 1/2015 | Thompson | G06Q 40/025 705/38 |
| 2015/0026566 A1* | 1/2015 | Hui | G06F 16/957 715/240 |
| 2015/0052579 A1* | 2/2015 | Yu | G06F 21/316 726/3 |
| 2015/0052584 A1* | 2/2015 | Rudraraju | H04L 63/102 726/4 |
| 2015/0058923 A1* | 2/2015 | Rajagopal | G06F 21/36 726/1 |
| 2015/0095822 A1* | 4/2015 | Feis | G06F 3/04842 715/765 |
| 2015/0127665 A1* | 5/2015 | Keohane | G06F 16/955 707/751 |
| 2015/0143223 A1* | 5/2015 | Kolam | H04L 69/329 715/234 |
| 2015/0149329 A1* | 5/2015 | Tam | G06F 8/60 705/27.2 |
| 2015/0154287 A1* | 6/2015 | Gao | G06F 16/338 707/723 |
| 2015/0156203 A1* | 6/2015 | Giura | G06F 9/45558 726/4 |
| 2015/0170537 A1* | 6/2015 | Super | A61B 5/162 434/236 |
| 2015/0193395 A1 | 7/2015 | Nicolaou et al. | |
| 2015/0222692 A1* | 8/2015 | Jenkins | G06F 21/50 709/203 |
| 2015/0237049 A1* | 8/2015 | Grajek | H04L 67/02 726/7 |
| 2015/0244758 A1* | 8/2015 | Kolowich | H04N 21/42203 709/231 |
| 2015/0269129 A1* | 9/2015 | Dou | G06F 16/9562 715/208 |
| 2015/0271094 A1* | 9/2015 | Lin | H04L 47/748 709/226 |
| 2015/0271166 A1* | 9/2015 | Paxton | G06F 16/24578 726/2 |
| 2015/0294429 A1* | 10/2015 | Williams | G06Q 50/01 705/319 |
| 2015/0319185 A1* | 11/2015 | Kirti | H04L 63/1416 726/23 |
| 2015/0334099 A1* | 11/2015 | Zhang | H04L 63/0861 726/6 |
| 2015/0341367 A1* | 11/2015 | Kus | G06F 21/6218 726/1 |
| 2015/0341385 A1 | 11/2015 | Sivan et al. | |
| 2015/0356179 A1* | 12/2015 | Zhukovskii | G06F 16/951 707/751 |
| 2015/0365420 A1* | 12/2015 | Kochhar | H04W 12/06 726/6 |
| 2015/0379266 A1* | 12/2015 | McLaughlin | H04L 63/14 726/23 |
| 2016/0006730 A1 | 1/2016 | Chari et al. | |
| 2016/0026727 A1* | 1/2016 | Bar-Yossef | G06F 16/9535 707/723 |
| 2016/0036722 A1* | 2/2016 | Obrecht | G06F 11/3442 709/226 |
| 2016/0048846 A1* | 2/2016 | Douglas | G06F 16/23 705/318 |
| 2016/0065551 A1* | 3/2016 | Huang | H04L 63/102 726/7 |
| 2016/0092085 A1* | 3/2016 | Kitner | G06F 3/017 715/738 |
| 2016/0094534 A1* | 3/2016 | Banno | H04L 63/08 726/4 |
| 2016/0099850 A1* | 4/2016 | Haserodt | H04L 43/04 709/224 |
| 2016/0099955 A1* | 4/2016 | Wespel | H04L 63/1466 726/23 |
| 2016/0105422 A1* | 4/2016 | Burch | H04L 63/10 726/6 |
| 2016/0112440 A1* | 4/2016 | Kolton | H04L 63/145 726/1 |
| 2016/0119209 A1* | 4/2016 | Rosengarten | H04L 67/51 709/224 |
| 2016/0119342 A1* | 4/2016 | Kus | H04L 63/0876 713/154 |
| 2016/0119348 A1* | 4/2016 | Kus | H04L 63/10 726/1 |
| 2016/0142443 A1* | 5/2016 | Ting | H04W 4/02 726/1 |
| 2016/0164915 A1* | 6/2016 | Cook | H04L 63/04 726/1 |
| 2016/0171901 A1 | 6/2016 | Beketayev et al. | |
| 2016/0182566 A1* | 6/2016 | Bean | H04L 63/20 726/22 |
| 2016/0212141 A1* | 7/2016 | Banerjee | H04L 63/0846 |
| 2016/0227042 A1* | 8/2016 | Gray | H04M 1/72403 |
| 2016/0241561 A1 | 8/2016 | Bubany et al. | |
| 2016/0241576 A1* | 8/2016 | Rathod | H04L 63/1425 |
| 2016/0269411 A1* | 9/2016 | Malachi | H04L 63/0421 |
| 2016/0275434 A1* | 9/2016 | Briganti | G06Q 10/06398 |
| 2016/0294786 A1* | 10/2016 | Marquez Mendoza | H04W 12/08 |
| 2016/0321104 A1* | 11/2016 | Fang | G06F 9/505 |
| 2016/0337346 A1* | 11/2016 | Momchilov | G06F 21/34 |
| 2016/0352760 A1* | 12/2016 | Mrkos | H04W 12/37 |
| 2016/0359905 A1* | 12/2016 | Touboul | H04L 63/20 |
| 2017/0011045 A1* | 1/2017 | Gershater | G06F 16/24578 |
| 2017/0039111 A1* | 2/2017 | Eyring | G06F 11/1448 |
| 2017/0070521 A1 | 3/2017 | Bailey et al. | |
| 2017/0070533 A1* | 3/2017 | Bailey | H04L 67/02 |
| 2017/0075954 A1 | 3/2017 | Alpers et al. | |
| 2017/0085412 A1* | 3/2017 | Greene | H04L 67/06 |
| 2017/0085522 A1* | 3/2017 | Greene | G06F 16/9574 |
| 2017/0139969 A1 | 5/2017 | Zhang et al. | |
| 2017/0149777 A1* | 5/2017 | Benson | H04W 12/068 |
| 2017/0161178 A1* | 6/2017 | Raghavan | G06F 11/3684 |
| 2017/0168924 A1 | 6/2017 | Dereszynski et al. | |
| 2017/0177823 A1* | 6/2017 | Erdmann | G16H 50/30 |
| 2017/0289168 A1* | 10/2017 | Bar | H04L 63/102 |
| 2017/0324752 A1* | 11/2017 | Todasco | H04L 63/0853 |
| 2017/0329966 A1* | 11/2017 | Koganti | H04L 63/1433 |
| 2018/0004751 A1* | 1/2018 | Vikhe | G06F 16/24578 |
| 2018/0007059 A1* | 1/2018 | Innes | G06F 21/6218 |
| 2018/0033026 A1* | 2/2018 | Sprague | G06Q 30/0277 |
| 2018/0034798 A1* | 2/2018 | Vincent | G06F 21/313 |
| 2018/0053199 A1 | 2/2018 | Mathis et al. | |
| 2018/0068026 A1* | 3/2018 | Chen | G06F 16/954 |
| 2018/0069883 A1 | 3/2018 | Meshi et al. | |
| 2018/0077160 A1* | 3/2018 | Call | H04L 67/564 |
| 2018/0082070 A1* | 3/2018 | Chennamsetty | G06F 21/62 |
| 2018/0097800 A1* | 4/2018 | Parikh | H04L 63/0815 |
| 2018/0109540 A1* | 4/2018 | Amar | H04L 63/0876 |
| 2018/0158358 A1* | 6/2018 | Hayafuchi | G09B 15/023 |
| 2018/0167384 A1* | 6/2018 | Raepple | G06F 21/335 |
| 2018/0176272 A1 | 6/2018 | Zur et al. | |
| 2018/0181958 A1* | 6/2018 | Locke | G06Q 20/401 |
| 2018/0196432 A1* | 7/2018 | Krupat | A61B 5/18 |
| 2018/0218145 A1* | 8/2018 | Hussain | H04L 63/10 |
| 2018/0240107 A1* | 8/2018 | Andrade | G06Q 20/36 |
| 2018/0241745 A1 | 8/2018 | Laporta | |
| 2018/0278725 A1* | 9/2018 | Thayer | H04L 67/561 |
| 2018/0288060 A1 | 10/2018 | Jackson et al. | |
| 2018/0295134 A1* | 10/2018 | Gupta | H04L 67/56 |
| 2018/0309834 A1* | 10/2018 | Nitta | G06F 13/00 |
| 2018/0315004 A1* | 11/2018 | Lecourtier | G06Q 10/083 |
| 2018/0316712 A1* | 11/2018 | Birch | H04L 63/1483 |
| 2018/0324265 A1* | 11/2018 | Macskassy | H04L 67/02 |

(56) References Cited

U.S. PATENT DOCUMENTS

| | | | |
|---|---|---|---|
| 2018/0375886 A1* | 12/2018 | Kirti | H04L 67/10 |
| 2019/0014102 A1* | 1/2019 | Mathew | G06F 21/41 |
| 2019/0018900 A1* | 1/2019 | Li | G06F 16/9538 |
| 2019/0036858 A1* | 1/2019 | Kovega | G06F 16/9566 |
| 2019/0058714 A1* | 2/2019 | Joshi | H04L 63/0823 |
| 2019/0065691 A1* | 2/2019 | Erdmann | G16H 10/60 |
| 2019/0068627 A1* | 2/2019 | Thampy | H04W 12/12 |
| 2019/0075130 A1* | 3/2019 | Petry | H04L 63/0209 |
| 2019/0088356 A1* | 3/2019 | Oliver | G09B 23/28 |
| 2019/0097977 A1* | 3/2019 | Martz | H04W 12/088 |
| 2019/0099653 A1* | 4/2019 | Wanke | A63B 24/0062 |
| 2019/0103968 A1* | 4/2019 | Srinivasan | H04L 9/0894 |
| 2019/0136211 A1* | 5/2019 | Kim | C12Q 1/42 |
| 2019/0166123 A1* | 5/2019 | Han | H04L 63/102 |
| 2019/0180875 A1* | 6/2019 | Gagne | G16H 10/20 |
| 2019/0222667 A1* | 7/2019 | Jaiswal | H04L 67/02 |
| 2019/0244131 A1 | 8/2019 | Levi et al. | |
| 2019/0273754 A1* | 9/2019 | Ting | G06N 3/088 |
| 2019/0306248 A1* | 10/2019 | Swarangi | H04L 9/50 |
| 2019/0334921 A1* | 10/2019 | Pattar | H04L 9/3271 |
| 2019/0336867 A1* | 11/2019 | Verma | A63F 13/5372 |
| 2019/0342315 A1* | 11/2019 | Smelov | H04L 43/06 |
| 2019/0354913 A1* | 11/2019 | Venkadesavaralu | G06Q 30/016 |
| 2019/0377902 A1* | 12/2019 | Schroeder | H04L 63/0414 |
| 2019/0386981 A1* | 12/2019 | Ramesh Kumar | H04L 9/3228 |
| 2020/0021620 A1* | 1/2020 | Purathepparambil | H04L 63/102 |
| 2020/0028876 A1* | 1/2020 | Cohen | H04L 63/1425 |
| 2020/0028926 A1 | 1/2020 | Sprague et al. | |
| 2020/0050773 A1* | 2/2020 | Schroeder | H04L 63/1416 |
| 2020/0053096 A1* | 2/2020 | Bendersky | G06F 21/32 |
| 2020/0053109 A1* | 2/2020 | Lancioni | H04L 63/1425 |
| 2020/0065169 A1* | 2/2020 | Wan | G06F 9/547 |
| 2020/0076792 A1* | 3/2020 | Ray | H04L 63/0815 |
| 2020/0089848 A1* | 3/2020 | Abdelaziz | H04L 63/1441 |
| 2020/0089887 A1* | 3/2020 | Luthra | G06F 21/577 |
| 2020/0099676 A1* | 3/2020 | Desarda | H04L 63/0815 |
| 2020/0099682 A1* | 3/2020 | Alexander | H04L 63/105 |
| 2020/0110623 A1 | 4/2020 | Vangala et al. | |
| 2020/0112562 A1* | 4/2020 | Hearty | G06F 21/44 |
| 2020/0126023 A1* | 4/2020 | Briganti | G06F 16/22 |
| 2020/0137092 A1* | 4/2020 | Yan | G06F 21/566 |
| 2020/0137221 A1* | 4/2020 | DelloStritto | H04M 3/42068 |
| 2020/0145425 A1* | 5/2020 | Chauhan | H04L 63/107 |
| 2020/0145504 A1* | 5/2020 | Price | G06F 16/9577 |
| 2020/0192966 A1* | 6/2020 | Borisov | H04L 67/02 |
| 2020/0195664 A1* | 6/2020 | Castilho | H04L 63/1416 |
| 2020/0250316 A1* | 8/2020 | Rickerd | G06F 9/44526 |
| 2020/0265138 A1* | 8/2020 | Shafet | G06Q 20/382 |
| 2020/0279041 A1* | 9/2020 | Endler | G06F 21/6245 |
| 2020/0279050 A1* | 9/2020 | Endler | G06F 16/144 |
| 2020/0311596 A1* | 10/2020 | Jain | G06F 18/22 |
| 2020/0357060 A1* | 11/2020 | Dalinina | G06K 9/6232 |
| 2020/0358780 A1* | 11/2020 | Anbalagan | H04L 63/105 |
| 2020/0380598 A1* | 12/2020 | Spector | G06V 30/418 |
| 2020/0410553 A1* | 12/2020 | Watson | G06N 20/00 |
| 2020/0412717 A1* | 12/2020 | Puertas Calvo | H04L 63/1433 |
| 2021/0011880 A1 | 1/2021 | Marelas | |
| 2021/0019339 A1* | 1/2021 | Ghulati | G06Q 50/00 |
| 2021/0032682 A1* | 2/2021 | Rostami | C12Q 1/6806 |
| 2021/0042428 A1* | 2/2021 | Daftary | G06F 21/604 |
| 2021/0075689 A1 | 3/2021 | Ramanathan et al. | |
| 2021/0097168 A1* | 4/2021 | Patel | G06F 21/554 |
| 2021/0136059 A1* | 5/2021 | Gupta | H04L 63/0876 |
| 2021/0168147 A1* | 6/2021 | Gupta | H04L 63/08 |
| 2021/0183105 A1* | 6/2021 | Sneyers | G06T 7/90 |
| 2021/0194883 A1* | 6/2021 | Badhwar | H04L 63/107 |
| 2021/0200955 A1 | 7/2021 | Ben Kimon et al. | |
| 2021/0295419 A1* | 9/2021 | Karkare | G06K 7/1417 |
| 2021/0390011 A1* | 12/2021 | Cser | G06F 11/3692 |
| 2022/0035886 A1* | 2/2022 | Waterton | G06F 16/9566 |
| 2022/0213560 A1* | 7/2022 | Rostami-Hodjegan | C12Q 1/6881 |
| 2022/0215898 A1* | 7/2022 | Rostami-Hodjegan | C12Q 1/6876 |
| 2022/0255970 A1* | 8/2022 | Ford | H04L 63/10 |

OTHER PUBLICATIONS

Hausknecht et al."Web Application Content Security," Department of Computer Science and Engineering, Chalmers University of Technology, Goteberg, Sweden, 2018, ISBN 978-91-7597-768-3, pp. 1-173 (Year: 2018).*

Faynberg et alOn Dynamic Access Control in Web 2.0 and Beyond: Trends and Technologies, Bell Labs Technical Journal, Alcatel-Lucent, pp. 199-218 (Year: 2011).*

He et al "Web Site Auditing Using Web Access Log Data," 2009 Seventh Annual Communication Networks and Services Research Conference, IEEE Computer Society, pp. 94-101 (Year: 2009).*

Ndibwile et al."UnPhishMe: Phishing Attack Detection by Deceptive Login Simulation through an Android Mobile App," 2017 12th Asia Joint Conference on Information Security, pp. 38-47 (Year: 2017).*

Vastel "FP-Tester: Automated Testing of Browser Fingerprint Resilience," IEEE Computer Society, pp. 103-107 (Year: 2018).*

The Unique Id's You Can't Delete: Browser Fingerprints, Proceedings of 2018 International Conference on Emerging Trends and Innovations in Engineering and Technological Research (ICETIETR) IEEE, pp. 1-5 (Year: 2018).*

Laperdrix et al "Browser Fingerprinting: A Survey," arXIV, vol. 1, No. 1, Article, pp. 1-32 (Year: 2019).*

Rellermeyer et al "Cloud Platforms and Embedded Computing—The Operating Systems of the Future," pp. 1-6 (Year: 2013).*

Revulytics, Inc., "Get More From Your Data," 2018, one page.

Revulytics, Inc., "Product Usage Analytics for Data-Driven Software Development and License Compliance," Date Unknown, 11 pages, [Online] [Retrieved on Jan. 19, 2020] Retrieved from the Internet <URL: https://www.revulytics.com/>.

Servicenow, "ServiceNow—Digital Workflows for Enterprise—Make work, work better.," Date Unknown, eight pages, [Online] [Retrieved on Jan. 19, 2020] Retrieved from the Internet <URL: https://www.servicenow.com/>.

United States Office Action, U.S. Appl. No. 16/698,970, filed Sep. 13, 2021, 24 pages.

* cited by examiner

MONITORING RESOURCE UTILIZATION OF AN ONLINE SYSTEM BASED ON BROWSER ATTRIBUTES COLLECTED FOR A SESSION

BACKGROUND

Field of Art

This disclosure relates in general to monitoring resource utilization in online systems, and in particular to detecting unauthorized resource utilization based on browser attributes collected for a session.

Description of the Related Art

Online systems such as multi-tenant systems provide services to enterprises. For example, a multi-tenant system may support multiple tenants, each tenant representing an enterprise. Users from an enterprise connect with the multi-tenant system to use the services offered by the online system. Multi-tenant systems typically limit utilization of resources of the multi-tenant system by an enterprise. For example, a multi-tenant system may enforce a limit on the number of sessions that users of the enterprise can create within a time interval or the number of concurrent sessions that users of the enterprise can create.

Enterprises may exceed the allotted utilization for them. For example, users of a small enterprise may share credentials necessary to create sessions with the multi-tenant system. As a result, the number of users that interact with the online system exceeds the number of valid credential issued by the multi-tenant system resulting in higher resource utilization. A larger enterprise may not allow sharing of credentials since a single user can modify the credentials thereby affecting a large number of other users. However, larger enterprises can implement infrastructure that allows multiple client devices to reuse a session. Such infrastructure may be implemented using hardware and software maintained by an IT (information technology) organization of the enterprise. As a result, an enterprise can exceed the allotted resource utilization without requesting new sessions.

Multi-tenant systems would like to ensure that enterprises that use their services do not exceed the allotted resource utilization. However, conventional techniques fail to detect unauthorized resource utilization by an enterprise. Conventional techniques detect unauthorized use of credentials, for example, if a user steals credentials from an enterprise to connect with the online system. However, if each session is created by a client device of the enterprise using with valid credentials, conventional techniques fail to detect unauthorized resource utilization by the enterprise.

Figure 1:
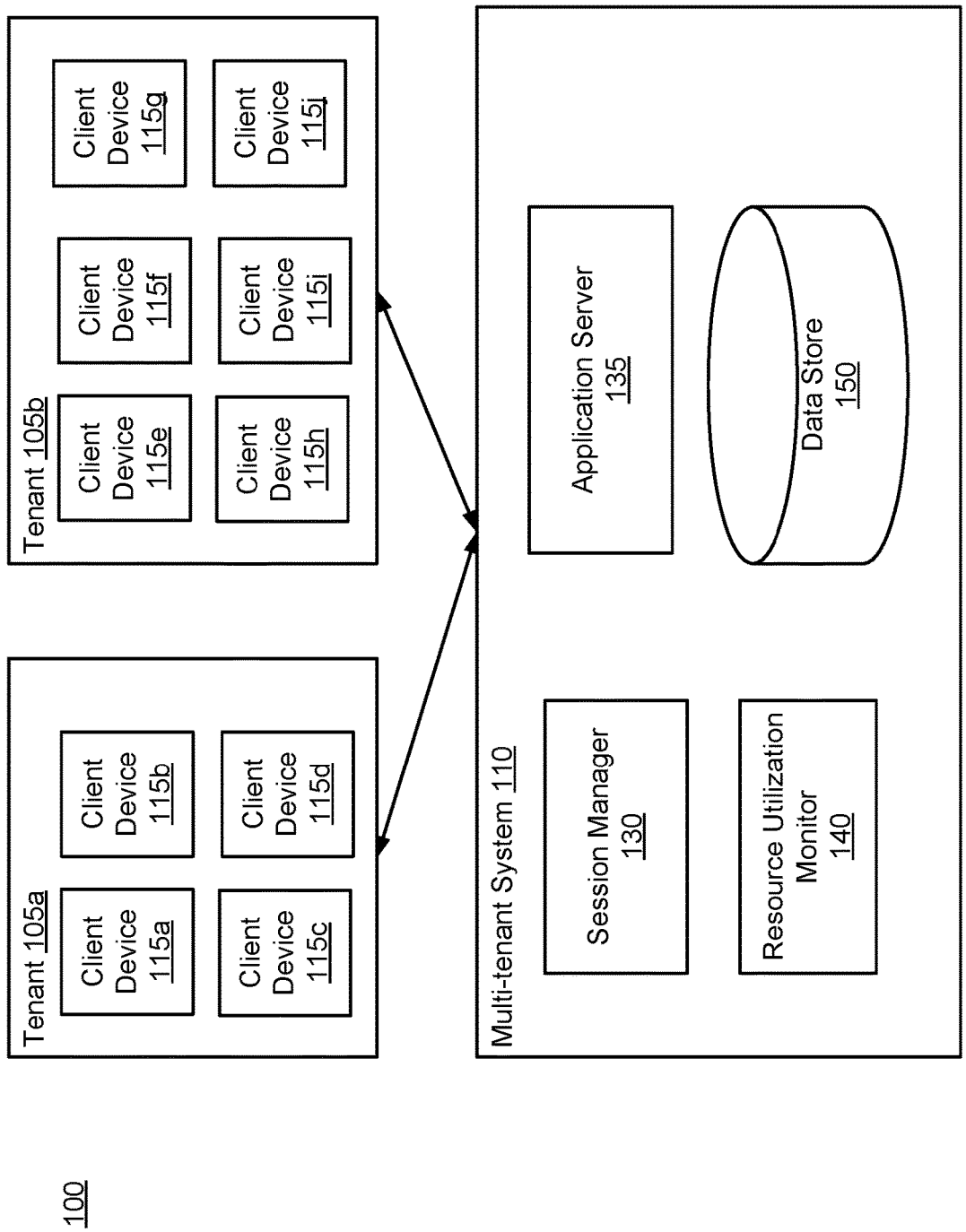
FIG. 1 is a block diagram of a system environment illustrating monitoring of resource utilization by a multi-tenant system, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "105a," indicates that the text refers specifically to the element having that particular reference numeral. A reference numeral in the text without a following letter, such as "105," refers to any or all of the elements in the figures bearing that reference numeral.

DETAILED DESCRIPTION

An online system, for example, a multi-tenant system offers services to enterprises. Each enterprise represents a set of users that can use the services offered by the online system. An enterprise typically has an agreement with the online system that limits the amount of resources of the online system utilized by users of the enterprise, for example, by imposing a limit on the number of sessions that users of the enterprise can create with the online system within a time interval. The online system uses the number of sessions as an estimate of the amount of resources used. As an example, if a typical user utilizes x amount of resources with a session and the enterprise has an agreement to limit the number of sessions to N within a time interval, the estimated resource utilization by the enterprise is $N*x$.

However, an enterprise can exceed the allotted amount of resource utilization by sharing sessions across users. For example, if a session is created for one user but shared by m users, the enterprise effectively utilizes $N*x*m$ resources of the online system. This resource utilization can be much higher than the amount agreed upon with the enterprise. The online system may not detect this excess resource utilization since the enterprise did not exceed the number of sessions that the enterprise is allowed to create and each session was created using valid credentials. Such resource utilization is considered unauthorized resource utilization.

Embodiments of the invention monitor resource utilization by enterprises of the online system and detect unauthorized resource utilization. The online system receives a request to access resources of the online system from a user of the enterprise via a browser executing on a client device. The online system receives credentials from the user creating the session and verifies that the credentials are valid. Responsive to determining that the credentials are valid, the online system grants access to the requested resource by issuing a session token to the browser. The online system grants access to the requested resource to browsers that provide valid session token. The online system may receive multiple requests for accessing the resource using the same session token.

The online system performs the following steps for each session token. The online system collects samples of browser attributes from browsers interacting with the online system using the session token. The samples of browser attributes are collected at different times during the session, for example, periodically. The online system determines a score indicating a difference between two samples of browser attributes taken at different times. The online system may determine the score as a weighted aggregate of differences between the browser attributes in the two samples. The online system determines based on the score whether the two samples of browser attributes were received from different browsers. If the online system determines that the two samples of browsers using the same session token were received from two different instances of browsers, the online system determines that unauthorized resource utilization occurred. The online system may take mitigating actions to control the unauthorized resource utilization, for example, by invalidating the session token or requiring users to re-enter valid credentials.

Overall System Environment

FIG. 1 is a block diagram of a system environment illustrating monitoring of resource utilization by a multi-tenant system according to one embodiment. The system environment 100 comprises a multi-tenant system 110 and one or more tenants 105, each tenant representing an enterprise associated with client devices 115 that connect with the multi-tenant system 110. In other embodiments, the system environment 100 may include more or fewer components.

The multi-tenant system 110 stores data of one or more tenants. Each tenant may be an enterprise that represents a customer of the multi-tenant system 110. Each tenant 105 may have multiple users that interact with the multi-tenant system via client devices 115. Various elements of hardware and software of the multi-tenant system 110 may be shared by multiple tenants.

In one embodiment, multi-tenant system 110 implements a web-based customer relationship management (CRM) system. For example, the multi-tenant system 110 may store applications configured to implement and execute CRM software applications. As an example, one tenant 105 might be a company that employs a sales force where each salesperson uses a client device 115 to manage their sales process. Thus, a user might maintain contact data, leads data, customer follow-up data, performance data, goals and progress data, etc., all applicable to that user's personal sales process.

The multi-tenant system 110 comprises a session manager 130, an application server 135, a resource utilization monitor 140, and a data store 150. The application server 135 provides various applications that can be used by tenants of the multi-tenant system 110. The application server 135 may simultaneously process requests for a number of tenants.

The data store 150 stores data for various tenants of the multi-tenant system 110. It is transparent to tenants that their data may be stored in a data store 150 that is shared with data of other tenants. The data store 150 may store data for different tenants in separate physical structures, for example, separate database tables or separate databases. Alternatively, the data store 150 may store data of multiple tenants in a shared structure. For example, user accounts for all tenants may share the same database table. However, the multi-tenant system 110 stores additional information to logically separate data of different tenants. Accordingly, data of one tenant is kept logically separate from that of other tenants so that one tenant does not have access to another tenant's data, unless such data is expressly shared.

The client devices 115 for each tenant 105 create sessions with the multi-tenant system 110. A client device 115 executes a browser that is used by a user to interact with the multi-tenant system 110. Examples of browsers include INTERNET EXPLORER, CHROME, SAFARI, FIREFOX, and so on. A browser may be a proprietary application of a tenant used to interact with the multi-tenant system.

The multi-tenant system 110 provides credentials that are used by client devices 115 to send requests to the multi-tenant system 110 via browsers. The session manager 130 of the multi-tenant system 110 receives requests to create sessions from client devices 115 along with credentials for verifying authenticity of the requests. The session manager 130 verifies the credentials to make sure that the request is from a valid user associated with a tenant 105. The session manager 130 creates a session for the requestor responsive to receiving valid credentials.

In an embodiment, the session manager 130 issues a session token in response to the request to create the session. The session token is subsequently provided by browsers executing on client devices 115 when they send requests for processing by the multi-tenant system 110. The multi-tenant system 110 processes requests if they are accompanied with valid session tokens. A session token may be valid for a predetermined period of time. Once a session token expires, the client device 115 is required to request a new session token to continue interacting with the multi-tenant system 110.

A tenant 105 may have an agreement with the multi-tenant system, for example, a license that imposes a limit on the maximum number of sessions that the tenant 105 is allowed to create within a time interval. The session manager 130 ensures that the number of sessions stays within any limits imposed by an agreement with the tenant. If a tenant attempts to create more sessions than are allowed, the session manager may deny the request or send a message to a system administrator of the tenant to revise the agreement to increase the number of allowed sessions.

As discussed herein, a tenant may reuse session tokens across multiple browsers to increase resource utilization without creating additional sessions. The resource utilization monitor 140 ensures that the resource utilization of multi-tenant system 110 by client devices of a tenant 105 is within an allotted quota. The resource utilization monitor 140 tracks session tokens issued by the session manager and determines whether the same session token is being used by multiple browsers. If the resource utilization monitor 140 detects excess resource utilization by a tenant, the resource utilization monitor 140 takes mitigating action, for example, by denying subsequent requests to create sessions by client devices of the tenant 105 responsive to detecting unauthorized resource utilization. Alternatively, the multi-tenant system 110 may send a message to a system administrator of the tenant 105 indicating excess resource utilization by the tenant with a request to revise the agreement with the multi-tenant system 110 in accordance with the high level of resource utilization.

Various components shown in FIG. 1 including the client devices 115 and the multi-tenant system 110 represent computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions. The interactions between the various components of the system environment 100 are typically performed via a network, not shown in FIG. 1.

Although embodiments disclosed herein are described in connection with a multi-tenant system, the techniques disclosed are applicable to other online systems as well. For example, an online system may provide services to one or more enterprises with a limit on the resource utilization of each enterprise. The online system can use the techniques disclosed herein to determine whether any enterprise is performing unauthorized resource utilization by sharing sessions.

System Architecture

Figure 2:
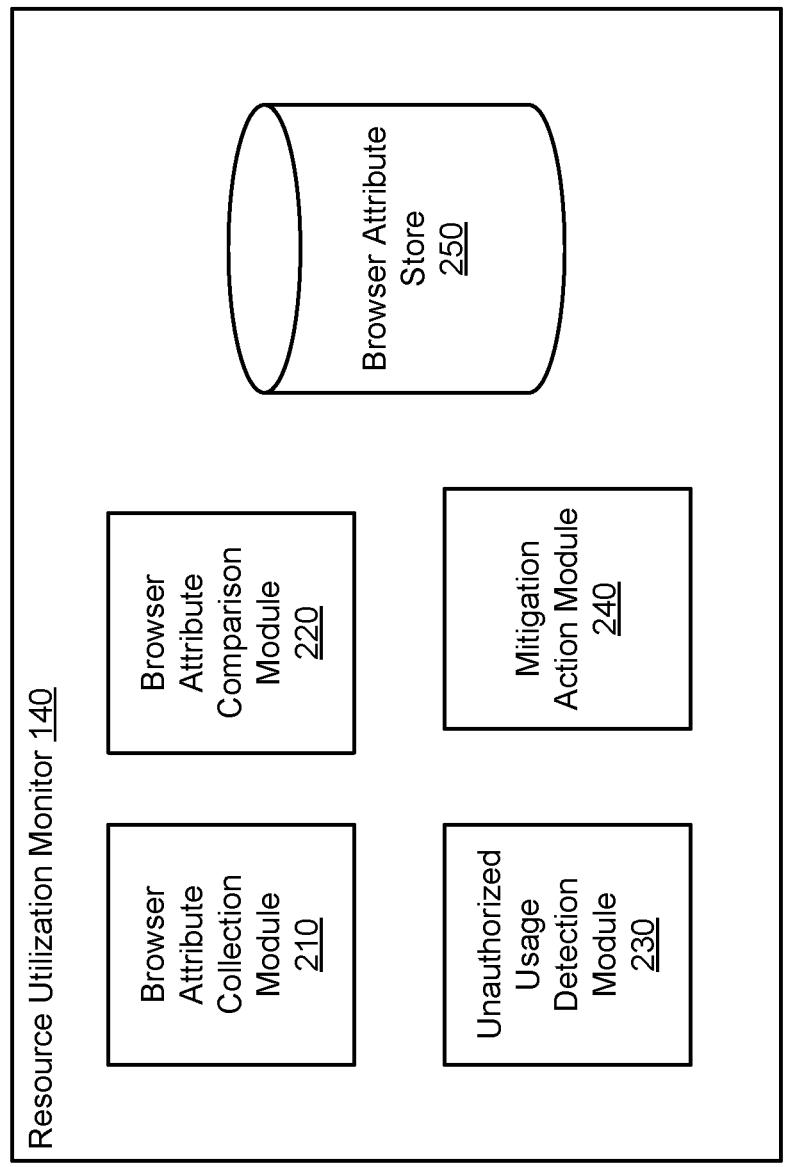
FIG. 2 is a block diagram illustrating components of a resource utilization monitor, according to one embodiment.

FIG. 2 is a block diagram illustrating components of a resource utilization monitor according to one embodiment. The resource utilization monitor 140 comprises a browser attribute collection module 210, a browser attribute comparison module 220, an unauthorized usage detection module 230, a mitigation action module 240, and a session data store 250. Other embodiments can have different and/or other components than the ones described here, and that the functionalities can be distributed among the components in a different manner.

The browser attribute collection module 210 periodically receives samples of browser attributes associated with a session and stores them in the browser attribute store 250. A sample of browser attributes may also be referred to herein as a set of browser attributes. For example, the browser attribute collection module 210 may receive samples of browser attributes associated with a session every 5 minutes.

A sample of browser attributes includes browser attributes of various types. Each sample of browser attributes describes the browser that was used to interact with the multi-tenant system 110 via a session. Examples of browser attributes that are received from a browser executing on a client device include (1) IP (internet protocol) address of the client device, (2) platform representing the operating system executing on the client device, (3) CPU (central processing unit) class representing the type or architecture of CPU of the client device, (4) languages supported by the browser, (5) fonts supported the browser, (6) plugins on the browser, (7) media devices attached to the client device, (8) codecs supported by the browser, (9) time zone offset of the browser representing a number of minutes from GMT time, (10) a user agent identifying the type of browser, (11) autonomous system number (ASN), (12) information describing the screen on which the browser was displayed such as the screen resolution, (13) do not track setting represented as a boolean value, (14) a digital rights management setting of the browser, and so on.

In an embodiment, the multi-tenant system 110 sends instructions of a scripting language for execution on the browser, for example, JAVASCRIPT instructions. These instructions include functions to extract various browser attributes and send them to the multi-tenant system. These instructions are typically installed with permission of the user interacting with the multi-tenant system or by a system administrator of the tenant as part of an agreement with the multi-tenant system 110. The browser attribute collection module 210 tracks session tokens and stores the browser attributes in association with the session token of the session used by the browser for interacting with the multi-tenant system.

Figure 5:
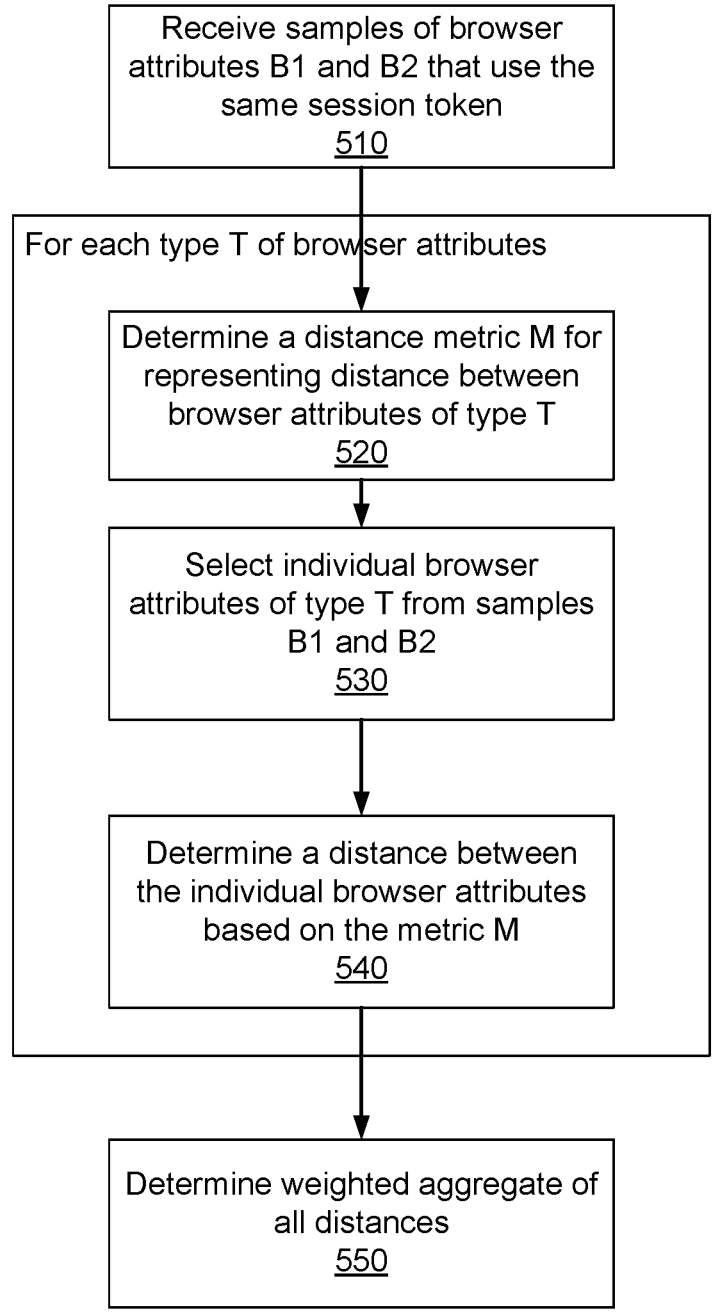
FIG. 5 is a flow chart illustrating the process for comparing two browser attributes, according to one embodiment.

The browser attribute comparison module 220 takes two samples of browser attributes and compares them. In an embodiment, the browser attribute comparison module 220 determines a measure of distance between the two samples of browser attributes. FIG. 5 describes a process for determining the measure of distance between two samples of browser attributes.

The unauthorized usage detection module 230 receives samples of browser attributes collected by the browser attribute collection module 210 and invokes the browser attribute comparison module 220 to compare the samples of browser attributes. It determines whether the two samples of browser attributes represent browsers of the same tenant. It further determines whether two samples of browser attributes of the same tenant using the same session token are from distinct browsers. Accordingly, the unauthorized usage detection module 230 determines whether a tenant is reusing session tokens across distinct browsers. If the unauthorized usage detection module 230 detects that the tenant is reusing session tokens across distinct browsers, the unauthorized usage detection module 230 flags unauthorized resource utilization by the tenant.

If the unauthorized usage detection module 230 flags unauthorized resource utilization by the tenant, the mitigation action module 240 takes mitigation actions. The mitigation action module 240 may alert a user of the enterprise or a system administrator of the multi-tenant system 110 about the unauthorized resource utilization. The mitigation action module 240 may provide the enterprise with a recommendation to revise the agreement with the multi-tenant system 110, for example, by acquiring more licenses. In an embodiment, the mitigation action module 240 aggregates various instances of unauthorized resource utilization by the tenant to determine an estimate of actual resource usage of the tenant. The mitigation action module 240 uses the estimate of actual resource usage to recommend a number of licenses that the tenant requires based on the actual usage.

In an embodiment, the mitigation action module 240 requires the end user to pass enhanced authentication, for example, a captcha. If the enterprise is running automated processes that reuse session tokens across multiple browsers, requiring the users to pass a captcha requires manual intervention, thereby causing the automatic process to fail.

In an embodiment, the mitigation action module 240 requires the user to re-enter credentials, for example, re-enter password previously used to create the session. If the tenant is sharing session tokens across users without providing them valid credentials, the users are unlikely to be able to provide the credentials. If the enterprise shares the same password with multiple users, the mitigation action module 240 may not be able to stop the unauthorized resource utilization by requiring users to re-enter credential. However, enterprises that are large are unlikely to share credentials across users since any user can modify the credentials, thereby disrupting the use of the multi-tenant system by other users of the enterprise.

In an embodiment, the mitigation action module 240 logs out the user suspected of unauthorized resource utilization. This forces the user to re-authenticate by re-entering credential to obtain a new session token. This mitigation action has same effect as requiring the user to re-enter credentials.

The mitigating actions taken by the mitigation action module 240 to prevent unauthorized resource utilization are different from mitigation actions that may be taken if a user outside the enterprise is determined to have stolen credentials. For example, if a user outside the enterprise has stolen credentials, it is ineffective to request the user to re-enter credentials since the user is in possession of valid credentials. Similarly, logging out the user is also ineffective since the user has stolen credentials that the user can re-enter. In contrast these mitigation actions are effective against unauthorized resource utilization if an enterprise does not share credentials across users but uses an automatic mechanism to share sessions across browsers.

Overall Process

Figure 3:
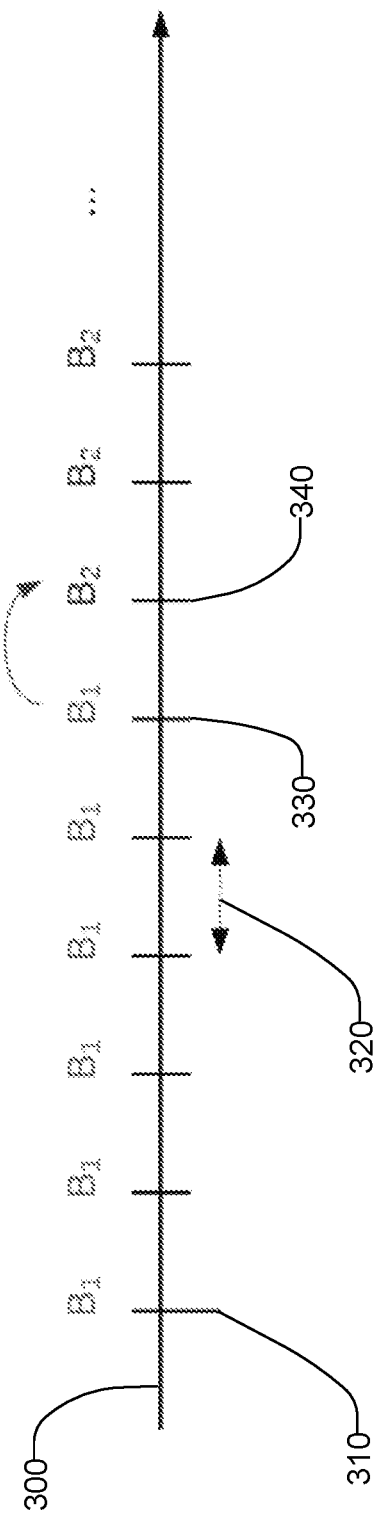
FIG. 3 illustrates comparison of browser attributes collected for a session, according to one embodiment.

FIG. 3 illustrates comparison of browser attributes collected for a session, according to one embodiment. FIG. 3 shows a time line 300 associated with a session with the multi-tenant system 110. The first data point 310 on the time line indicates a sample of browser attributes received when the user logs in and initiates the session. For the rest of the session, the resource utilization monitor 140 periodically obtains the browser attributes for the session, for example, every 5 minutes as indicated by the time interval 320. In an embodiment, the multi-tenant system 110 allows a system administrator to configure the rate at which the browser attributes are obtained.

The resource utilization monitor 140 compares each sample of browser attributes with the previous sample of browser attributes that was obtained. The resource utilization monitor 140 determines based on the comparison, if the difference between the samples of browser attributes indicates that the session token was shared by two distinct browsers. For example, the samples of browser attributes B1 and B2 obtained at time points 330 and 340 respectively indicate more than a threshold difference between browser attributes indicating unauthorized resource utilization.

Figure 4:
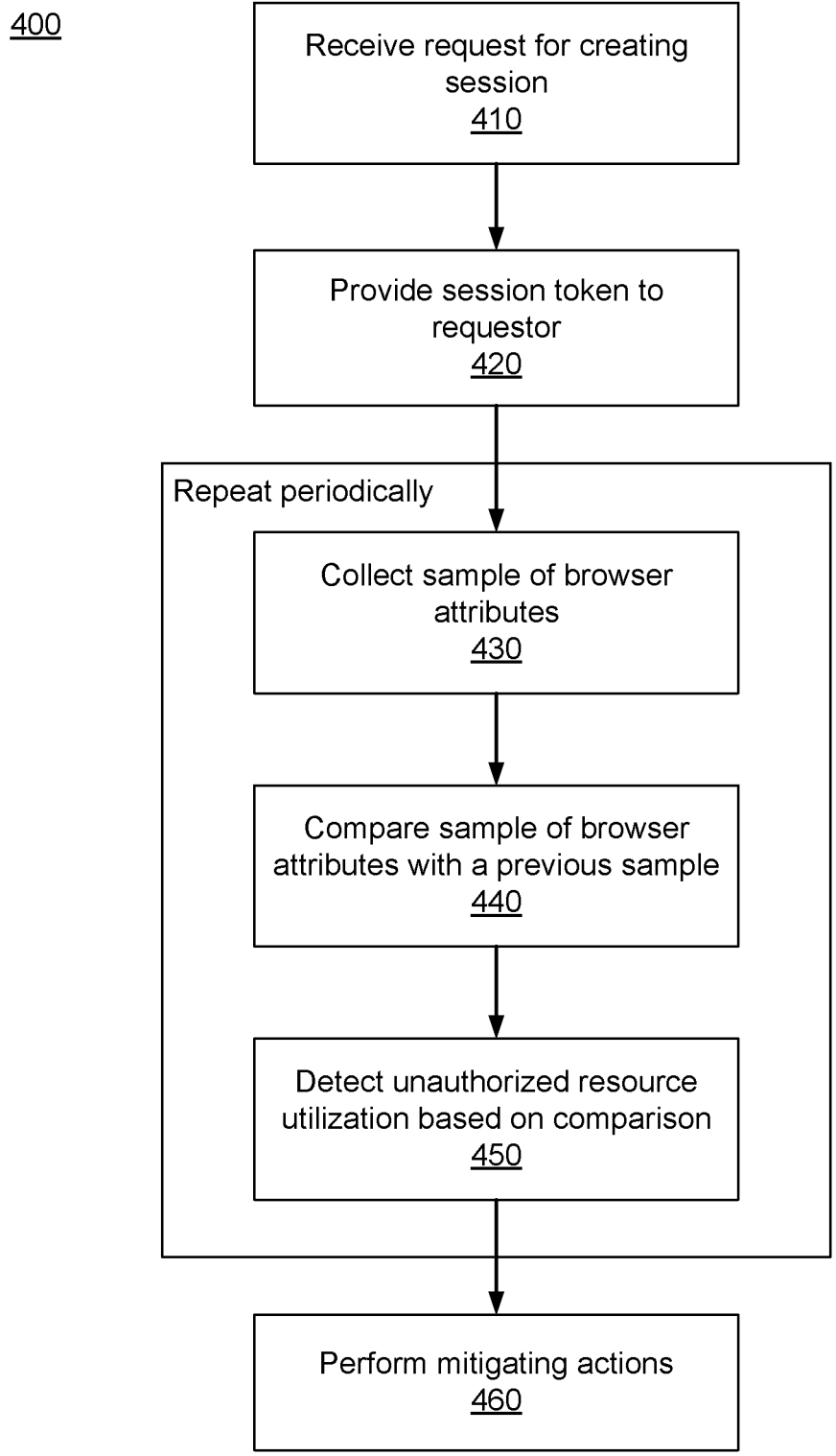
FIG. 4 is a flow chart illustrating the process for determining unauthorized resource utilization, according to one embodiment.

FIG. 4 is a flow chart illustrating the process for determining unauthorized resource utilization according to one embodiment. Other embodiments can perform the steps of FIG. 4 in different orders. Moreover, other embodiments can include different and/or additional steps than the ones described herein.

The multi-tenant system 110 receives 410 a request to create a session from a user associated with a tenant and receives credentials for creating the session. The request may be for access to a resource of the multi-tenant system and is received from a browser executing on a client device 115 associated with the tenant. Examples of resources include applications running on the multi-tenant system 110 or databases stored on the multi-tenant system 110. For example, a user may send a request via a browser to run an application on the multi-tenant system 110 or perform a query or execute a transaction on a database stored on the multi-tenant system 110.

The multi-tenant system 110 verifies the credentials to ensure that they represent a valid user associated with the tenant. If the multi-tenant system 110 determines that the credentials received are valid, the multi-tenant system 110 provides 420 a session token to the requestor. The multi-tenant system 110 grants access to the resource to browsers that provide valid session tokens.

The multi-tenant system 110 receives samples of browser attributes from the browser that sends the session token. The multi-tenant system 110 may issue multiple session tokens at the same time for a tenant. The multi-tenant system 110 repeats the following steps 430, 440, and 450 for each session token. The multi-tenant system 110 collects 430 samples of browser attributes from browsers in a session for that session token. The samples of browser attributes may be collected at different times during the session.

The multi-tenant system 110 determines a score indicating a difference between two samples of browser attributes taken at different times. The score may be determined as a weighted aggregate of differences between the browser attributes in the two samples. The multi-tenant system 110 determines based on the score whether the two samples of browser attributes were received from different browsers. The multi-tenant system 110 detects 450 unauthorized resource utilization if it determines that the two samples of browser attributes were received from different browsers. If the multi-tenant system 110 detects unauthorized resource utilization, the multi-tenant system 110 performs 460 mitigating actions as described in connection with mitigation action module 240.

In an embodiment, the multi-tenant system 110 also determines whether the browser attributes represent the same tenant, for example, the same organization or enterprise that has an agreement with the multi-tenant system 110. The multi-tenant system 110 determines that the browser attributes represent the same tenant if the two sample browser attributes have matching browser attributes representing the internet protocol (IP) address or the autonomous system number (ASN). If the multi-tenant system 110 determines that the two sample browser attributes represent two different tenants or two different organizations or enterprises, the multi-tenant system 110 makes a determination that there is no unauthorized resource utilization even if the same session token is being used by two different browsers. The multi-tenant system 110 makes this determination since the enterprise is not sharing session tokens across browsers for unauthorized resource utilization. The multi-tenant system 110 may make a different determination that there is a security breach of the enterprise since session tokens are being stolen by a client device outside the enterprise and may report this incident to the enterprise.

FIG. 5 is a flow chart illustrating the process for comparing two browser attributes according to one embodiment. Other embodiments can perform the steps of FIG. 4 in different orders. Moreover, other embodiments can include different and/or additional steps than the ones described herein.

The browser attribute comparison module 220 receives 510 two samples of browser attributes B1 and B2 from browsers that provided the same session token. The browser attribute comparison module 220 determines a metric indicating a distance between the two samples of browser attributes as follows. Each sample of browser attributes may include different types of browser attributes. The browser attribute comparison module 220 may use a different distance metric for different types of browser attributes.

For each type T of browser attributes, the browser attribute comparison module 220 performs the steps 520, 530, and 540. The browser attribute comparison module 220 determines a type of metric Mused for representing distance between browser attributes of type T The browser attribute comparison module 220 identifies an individual browser attribute $B_{1i}$ of type T from the set B1 and corresponding browser attribute $B_2$ of type T from the set B2. The browser attribute comparison module 220 determines a distance between $B_{1i}$ and $B_{2i}$ using the distance metric M for the type T of browser attributes.

The browser attribute comparison module 220 determines a weighted aggregate of all the distance metrics determines for corresponding pairs of individual browser attributes from the samples of browser attributes B1 and B2. In an embodiment, the weighted aggregate computation is represented using the following equation.

$$\text{score} = \sum_{i=1}^{F} w_i * d_i(B_{1i}, B_{2i}) \qquad (1)$$

In the above equation score represents a numerical score representing the result of the weighted aggregate computation, F represents the number of individual browser attributes in each sample of browser attributes B1 or B2, $w_i$ represents the weight corresponding to the $i^{th}$ individual browser attribute, $d_i$ represents the distance between the individual browser attributes $B_{1i}$ and $B_{2i}$. The browser attribute comparison module 220 provides the weighted aggregate of the distance metrics as the measure of distance between the two samples of browser attributes B1 and B2 for comparing 440 them.

In an embodiment the weights $w_i$ are determined using the following equation.

$$w_i = e^{-Entropy_i} = e^{\Sigma_p[i]log(p[i])} \quad (2)$$

In the above equation, $w_i$ represents the weight for the $i^{th}$ browser attribute derived using historical data and $p^{[i]}$ denotes the probability distribution for the $i^{th}$ browser attribute over a time interval, for example, past 30 days. The summation in the above equation is performed over all browser attributes. The browser attribute comparison module 220 analyzes the browser attributes over the time interval to determine a frequency of each distinct value of the browser attribute. The browser attribute comparison module 220 determines a probability distribution based on the frequency of the each distinct value of the browser attribute. The browser attribute comparison module 220 determines the weight using the above equation (2).

The browser attribute comparison module 220 determines the distance for each type of browser attribute using a distance metric dependent on the type of browser attribute. Examples of distance metrics for different types of browser attributes are as follows.

Some browser attributes are represented as categorical values or as boolean values. An example of a categorical variable is CPU class that takes one of several values indicating different types of CPUs. An example of a boolean variable is the do not track setting of the browser that can be either true or false. The distance metric for categorical browser attributes or boolean browser attributes are determines using a function that takes two input values and returns a value indicating whether the two input values are equal. For example, the function may return 1 if the two input values are equal and 0 if the two input values are not equal.

Some browser attributes are represented as tuples. For example, the dimensions of the screen of the client device is represented using two dimensions such as (1920, 1080) or (640, 480). Each tuple has a plurality of dimensions. The distance metric for browser attributes represented as tuples is an aggregate of differences between corresponding elements of the tuple. The browser attribute comparison module 220 receives two browser attribute values, each represented as a tuple comprising a plurality of elements. The browser attribute comparison module 220 determines differences between the corresponding elements of the tuples. The browser attribute comparison module 220 determines an aggregate of the differences. According to an embodiment, if the two browser attributes are represented as $B_{1i}=(x_1,y_1)$ and $B_{2i}=(x_2,y_2)$, the distance d between the browser attributes is determined using following equation (3).

$$d_i(B_{1i}, B_{2i}) = \sqrt{\frac{1}{2}\left(\frac{x_1-x_2}{\max(x_1,x_2)}\right)^2 + \frac{1}{2}\left(\frac{y_1-y_2}{\max(y_1,y_2)}\right)^2} \quad (3)$$

Some browser attributes are represented as strings, for example, the user agent browser attribute or the plugins browser attribute. The distance between two browser attributes $B_{1i}$ and $B_{2i}$ represented as strings is determined using the following equation (4).

$$d_i(B_{1i}, B_{2i}) = \frac{Levenshtein(B_{1i}, B_{2i})}{maxlen(B_{1i}, B_{2i})} \quad (4)$$

Some browser attributes are represented as bit arrays, for example, fonts browser attribute. The distance between two browser attributes $B_{1i}$ and $B_{2i}$ represented as bit arrays is determined using the following equation (5).

$$d_i(B_{1i}, B_{2i}) = \frac{BitwiseHamming(B_{1i}, B_{2i})}{len(B_{1i}, B_{2i})} \quad (5)$$

In the above equation (5), the BitwiseHamming function for two bit arrays is the value indicating the number of bits that are different between the two bit arrays and the function len is the length of the bit arrays. Accordingly, the browser attribute comparison module 220 determines the distance between two bit arrays by determining the bit wise hamming distance between the two bit arrays and dividing by the length of each bit array.

Some browser attributes can be represented as floating point numbers, for example, time zone offset value.

$$d_i(B_{1i}, B_{2i}) = \frac{|B_{1i}, B_{2i}|}{MaxDifference} \quad (6)$$

In equation (6), MaxDifference represents the maximum possible difference between the two browser attribute values. For example, for timezone offset, the MaxDifference value is 24 hours. The browser attribute comparison module 220 receives two floating point numbers as inputs, determines the absolute value of the difference of the two inputs and divides the result by the MaxDifference value.

Computer Architecture

Figure 6:
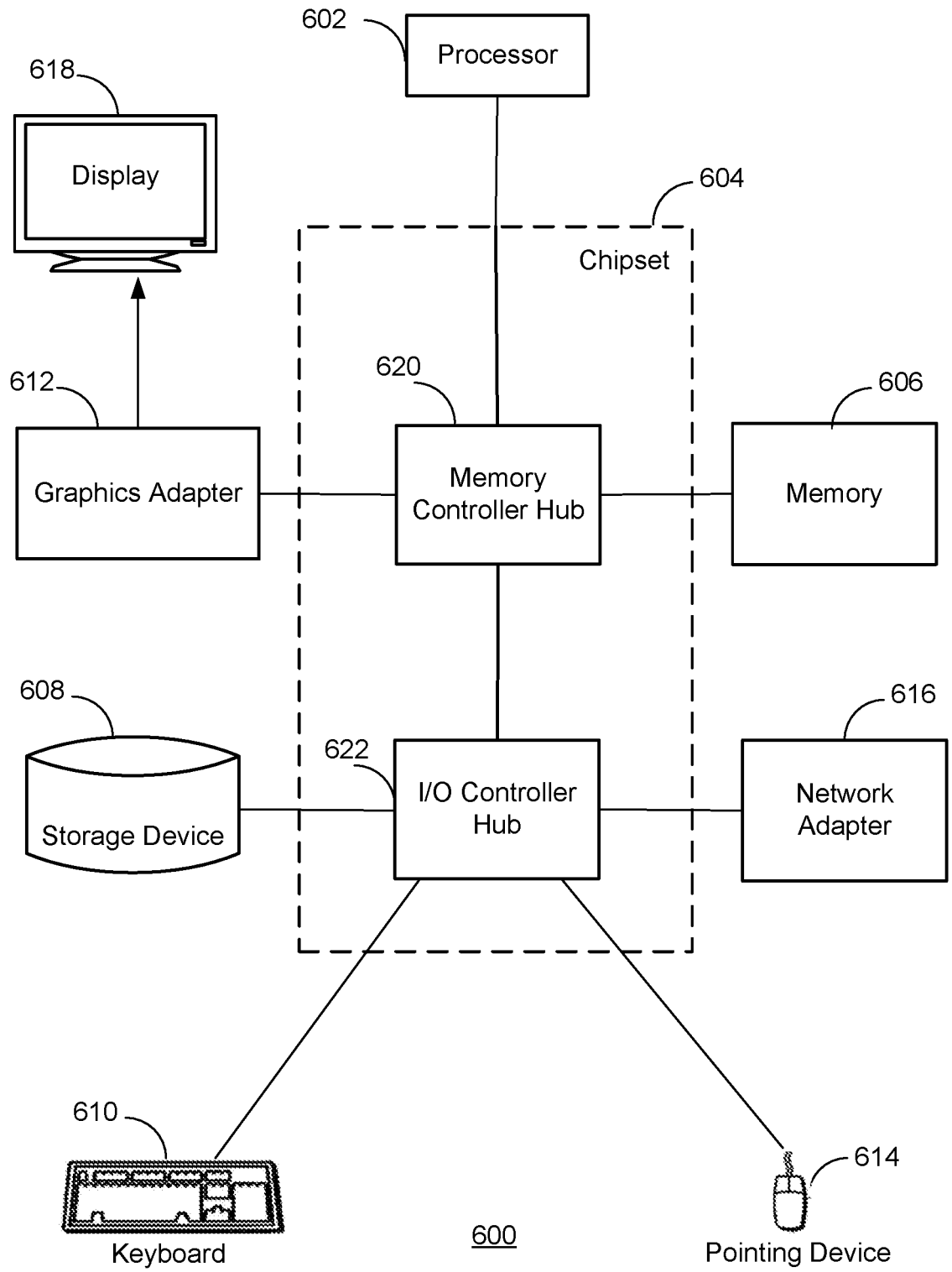
FIG. 6 is a block diagram illustrating a functional view of a typical computer system for use in the environment of FIG. 1 according to one embodiment.

FIG. 6 is a high-level block diagram illustrating a functional view of a typical computer system for use as one of the entities illustrated in the environment 100 of FIG. 1 according to an embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 200. The graphics adapter 612 displays images and other information on the display 618. The network adapter 616 couples the computer system 600 to a network.

As is known in the art, a computer 600 can have different and/or other components than those shown in FIG. 6. In addition, the computer 600 can lack certain illustrated components. For example, a computer system 600 acting as a multi-tenant system 110 may lack a keyboard 610 and a pointing device 614. Moreover, the storage device 608 can be local and/or remote from the computer 600 (such as embodied within a storage area network (SAN)).

The computer 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the entities of FIG. 1 can vary depending upon the embodiment and the processing power used by the entity. For example, a client device 115 may be a mobile phone with limited processing power, a small display 618, and may lack a pointing device 614. The multi-tenant system 110 and the secondary platform 120, in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for detecting unauthorized resource utilization, the method comprising:
   in response to receiving valid credentials from a browser associated with an organization that is requesting access to a resource, issuing, by an online system, a session token to the browser, wherein access to the resource is granted to browsers that provide the session token during a session;
   collecting a first sample of browser attributes from a first browser that provides the session token during the session;
   collecting a second sample of browser attributes from a second browser that provides the session token during the session, wherein the browser attributes from the first browser and the second browser comprise:
   a CPU (central processing unit) class representing a type or architecture of a CPU of a client device,
   languages supported by the browser,
   fonts supported by the browser,
   media devices attached to the client device,
   codecs supported by the browser,
   a time zone offset of the browser representing a number of minutes from GMT time, a user agent identifying a type of browser,
an autonomous system number (ASN),
information describing a screen on which the browser was displayed such as screen resolution,
a do not track setting represented as a Boolean value, and
a digital rights management setting of the browser;
determining a score indicating a distance between the first and second samples of browser attributes collected during the session, the score determined at least in part on (1) for a browser attribute, computing a distance between two values of the browser attribute in the two samples, and (2) computing a weighted aggregate of the distances between the values of corresponding browser attributes in the two samples;
determining based on the score whether the first and second samples of browser attributes collected during the session were received from different browsers, indicating that the organization shares the session token across different browsers;
responsive to determining that the organization shares the session token across the different browsers, detecting unauthorized resource utilization by the organization; and
responsive to determining unauthorized resource utilization by the organization performing a mitigation action, wherein the mitigation action is configured to alert a user, provide a recommendation to the user, or stop the unauthorized resource utilization,
wherein the weighted aggregate assigns high weight to browser attributes representing (1) a platform of a client device running the browser or (2) the CPU Class of the client device running the browser compared to browser attributes representing (1) the agent of the browser or (2) plugins of the browser.

2. The computer implemented method of claim 1, wherein a weight for a browser attribute is determined based on historical values of the browser attribute collected over a past time interval.

3. The computer implemented method of claim 1, wherein a weight for a browser attribute is determined based on a frequency of distribution of values of the browser attribute over a past time interval.

4. The computer implemented method of claim 1, wherein each sample of browser attributes has a type, and wherein the distance between the browser attribute in the two samples of browser attributes is determined using a distance metric associated with the type of the browser attribute.

5. The computer implemented method of claim 1, wherein the mitigation action comprises one or more of:
invalidating the session token; requiring the user to re-authenticate; or logging the user out.

6. The computer implemented method of claim 1, further comprising:
determining that the first and second samples of browser attributes are from browsers of the organization if the first and second samples of browser attributes have matching browser attributes representing one or more of an internet protocol (IP) address or an autonomous system number (ASN); and
wherein unauthorized resource utilization is detected responsive to determining that the two samples of browser attributes are from browsers of the organization.

7. The computer implemented method of claim 1, wherein the computer implemented method is implemented at an online system, and the online system is a multi-tenant system, further comprising:
determining that the two samples of browser attributes are from browsers of a same tenant.

8. A non-transitory computer readable storage medium for storing instructions that when executed by a computer processor cause the computer processor to perform steps for detecting unauthorized resource utilization, the steps comprising:
in response to receiving valid credentials from a browser associated with an organization that is requesting access to a resource, issuing, by an online system, a session token to the browser, wherein access to the resource is granted to browsers that provide the session token during a session;
collecting a first sample of browser attributes from a first browser that provides the session token during the session;
collecting a second sample of browser attributes from a second browser that provides the session token during the session, wherein the browser attributes from the first browser and the second browser comprise:
a CPU (central processing unit) class representing a type or architecture of a CPU of a client device,
languages supported by the browser,
fonts supported by the browser,
media devices attached to the client device,
codecs supported by the browser,
a time zone offset of the browser representing a number of minutes from GMT time,
a user agent identifying a type of browser,
an autonomous system number (ASN),
information describing a screen on which the browser was displayed such as screen resolution,
a do not track setting represented as a Boolean value, and
a digital rights management setting of the browser;
determining a score indicating a distance between the first and second samples of browser attributes collected during the session, the score determined at least in part on (1) for a browser attribute, computing a distance between two values of the browser attribute in the two samples, and (2) computing a weighted aggregate of the distances between the values of corresponding browser attributes in the two samples;
determining based on the score whether the first and second samples of browser attributes collected during the session were received from different browsers, indicating that the organization shares the session token across different browsers;
responsive to determining that the organization shares the session token across the different browsers, detecting unauthorized resource utilization by the organization; and
responsive to determining unauthorized resource utilization by the organization, performing a mitigation action, wherein the mitigation action is configured to alert a user, provide a recommendation to the user, or stop the unauthorized resource utilization,
wherein the weighted aggregate assigns high weight to browser attributes representing (1) a platform of a client device running the browser or (2) the CPU Class of the client device running the browser compared to browser attributes representing (1) the user agent of the browser or (2) plugins of the browser.

9. The non-transitory computer readable storage medium of claim 8, wherein a weight for a browser attribute is determined based on historical values of the browser attribute collected over a past time interval.

10. The non-transitory computer readable storage medium of claim 8, wherein a weight for a browser attribute is determined based on a frequency of distribution of values of the browser attribute over a past time interval.

11. The non-transitory computer readable storage medium of claim 8, wherein each sample of browser attributes has a type, and wherein the distance between the browser attribute in the two samples of browser attributes is determined using a distance metric associated with the type of the browser attribute.

12. The non-transitory computer readable storage medium of claim 8, wherein the mitigation action comprises one or more of:
   invalidating the session token; requiring the user to re-authenticate; or logging the user out.

13. The non-transitory computer readable storage medium of claim 8, wherein the instructions further cause the processor to perform steps comprising:
   determining that the first and second samples of browser attributes are from browsers of the organization if the first and second samples of browser attributes have matching browser attributes representing one or more of an internet protocol (IP) address or an autonomous system number (ASN); and
   wherein unauthorized resource utilization is detected responsive to determining that the two samples of browser attributes are from browsers of the organization.

14. The non-transitory computer readable storage medium of claim 8, wherein the instructions further cause the processor to perform steps comprising:
   determining that the two samples of browser attributes represent a same tenant.

15. A computer system comprising:
   a computer processor; and
   a non-transitory computer readable storage medium for storing instructions that when executed by a computer processor cause the computer processor to perform steps for monitoring resource utilization, the steps comprising:
   in response to receiving valid credentials from a browser associated with an organization that is requesting access to a resource, issuing, by an online system, a session token to the browser, wherein access to the resource is granted to browsers that provide the session token during a session;
   collecting a first sample of browser attributes from a first browser that provides the session token during the session;
   collecting a second sample of browser attributes from a second browser that provides the session token during the session, wherein the browser attributes from the first browser and the second browser comprise:
   a CPU (central processing unit) class representing a type or architecture of a CPU of a client device,
   languages supported by the browser,
   fonts supported by the browser,
   media devices attached to the client device,
   codecs supported by the browser,
   a time zone offset of the browser representing a number of minutes from GMT time,
   a user agent identifying a type of browser,
   an autonomous system number (ASN),
   information describing a screen on which the browser was displayed such as the screen resolution,
   a do not track setting represented as a Boolean value, and
   a digital rights management setting of the browser;
   determining a score indicating a distance between the first and second samples of browser attributes collected during the session, the score determined at least in part on (1) for a browser attribute, computing a distance between two values of the browser attribute in the two samples, and (2) computing a weighted aggregate of the distances between the values of corresponding browser attributes in the two samples;
   determining based on the score whether the first and second samples of browser attributes collected during the session were received from different browsers, indicating that the organization shares the session token across different browsers;
   responsive to determining that the organization shares the session token across the different browsers, detecting unauthorized resource utilization by the organization; and
   responsive to determining unauthorized resource utilization by the organization, performing a mitigation action, wherein the mitigation action is configured to alert a user, provide a recommendation to the user, or stop the unauthorized resource utilization,
   wherein the weighted aggregate assigns high weight to browser attributes representing (1) a platform of a client device running the browser or (2) the CPU Class of the client device running the browser compared to browser attributes representing (1) the user agent of the browser or (2) plugins of the browser.

16. The computer system of claim 15, wherein each sample of browser attributes has a type, and wherein the distance between the browser attribute in the two samples of browser attributes is determined using a distance metric associated with the type of the browser attribute.

17. The computer system of claim 15, wherein the instructions further cause the processor to perform steps comprising:
   determining that the first and second samples of browser attributes are from browsers of the organization if the first and second samples of browser attributes have matching browser attributes representing one or more of an internet protocol (IP) address or an autonomous system number (ASN); and
   wherein unauthorized resource utilization is detected responsive to determining that the two samples of browser attributes are from browsers of the organization.

18. The computer system of claim 15, wherein the computer system is a multi-tenant system, further comprising:
   determining that the two samples of browser attributes are from browsers of a same tenant.

* * * * *